(12) United States Patent
Fu et al.

(10) Patent No.: US 9,942,582 B2
(45) Date of Patent: Apr. 10, 2018

(54) DYNAMIC SEEKING IN VIDEO DELIVERY SYSTEMS

(71) Applicant: HULU, LLC, Santa Monica, CA (US)

(72) Inventors: Deliang Fu, Beijing (CN); Shucheng Zhong, Beijing (CN); Zhibing Wang, Beijing (CN)

(73) Assignee: HULU, LLC, Santa Monica, CA (US)

(*) Notice: Subject to any disclaimer, the term of this patent is extended or adjusted under 35 U.S.C. 154(b) by 205 days.

(21) Appl. No.: 14/956,190

(22) Filed: Dec. 1, 2015

(65) Prior Publication Data
US 2017/0155932 A1    Jun. 1, 2017

(51) Int. Cl.
| | |
|---|---|
| *H04N 21/2387* | (2011.01) |
| *G11B 27/10* | (2006.01) |
| *H04N 21/24* | (2011.01) |
| *H04N 21/262* | (2011.01) |
| *H04N 21/44* | (2011.01) |
| *H04N 21/458* | (2011.01) |

(Continued)

(52) U.S. Cl.
CPC ......... *H04N 21/2387* (2013.01); *G11B 27/10* (2013.01); *H04N 21/2407* (2013.01); *H04N 21/262* (2013.01); *H04N 21/44004* (2013.01); *H04N 21/458* (2013.01); *H04N 21/6587* (2013.01); *H04N 21/8456* (2013.01)

(58) Field of Classification Search
CPC ........... H04N 21/2387; H04N 21/2407; H04N 21/262; H04N 21/44004; H04N 21/458; H04N 21/6587; H04N 21/8456; G11B 27/10
See application file for complete search history.

(56) References Cited

U.S. PATENT DOCUMENTS

| | | |
|---|---|---|
| 2008/0109865 A1 | 5/2008 | Su et al. |
| 2013/0124748 A1 | 5/2013 | Virdi et al. |

(Continued)

FOREIGN PATENT DOCUMENTS

| | | |
|---|---|---|
| JP | 2001-521340 A | 11/2001 |
| WO | 9921362 A2 | 4/1999 |

OTHER PUBLICATIONS

International Search Report and Written Opinion for International Appln. No. PCT/US2016/061433 dated Feb. 17, 2017, 10 pages.

*Primary Examiner* — Chenea Smith
(74) *Attorney, Agent, or Firm* — Fountainhead Law Group P.C.

(57) ABSTRACT

Particular embodiments provide dynamic seek processing that minimizes re-buffering after a seek request is received. When a seek occurs to a seeking position, a media player downloads a segment N of the media program that includes the seeking position. To address possible re-buffering, the media player employs a seeking process that may analyze playback factors to determine when to start playback after the segment N that contains the seeking position has been downloaded. Factors include the position within the segment N, the current bandwidth, the next segment's size, and the current bitrate being requested. Depending on these factors, the media player may decide to delay playback even though the segment N has already been downloaded. This allows the next segment N+1 more time to download and then playback can begin with less chance of re-buffering. Particular embodiments also provide a process to calculate the number of seconds to delay playback.

20 Claims, 6 Drawing Sheets

(51) Int. Cl.
   *H04N 21/845*   (2011.01)
   *H04N 21/6587*   (2011.01)

(56) References Cited

U.S. PATENT DOCUMENTS

2015/0037005 A1   2/2015   Tapper
2015/0134846 A1   5/2015   Bazar et al.

DYNAMIC SEEKING IN VIDEO DELIVERY SYSTEMS

BACKGROUND

Multiple bitrate streaming involves allowing a client to adaptively request different versions of a media program that has been encoded at multiple bitrates. For example, a client can select which version of a media program to request based on the available bandwidth or download speed. When the client determines that the available bandwidth is greater than the bitrate of the current version of the media program being downloaded, the client can request a higher bitrate version of the media program. In contrast, when the client determines that the available bandwidth is lower than the current bitrate of the current version of the media program being downloaded, the client can request a lower bitrate version of the media program.

The media program is split into multiple segments, which allows the client to change bitrates when requesting a new segment. For example, the media program may be split into multiple segments of equal time, such as 5-second segments. In other examples, the media program may be split into segments of different sizes, such as different segments may be 5 seconds, 7 seconds, 3 seconds, etc. The difference in segment size may be based on various media program characteristics, such as complexity. When playing the media program, a media player may request a segment of the media program to download. The entire segment needs to be downloaded before playback of that segment can begin. For example, the 5-second segment must be downloaded before playback can begin for that segment. When a user seeks in the media program to a seeking position, the media player can download the segment containing the seeking position and then start playback once the segment is downloaded.

SUMMARY

In one embodiment, a method receives a seek command at a media player that is playing a media program at a first location. The seek command seeks to a second location in the media program. A first segment of the media program is determined that is associated with the second location in the media program and the first segment is downloaded into a buffer. The method calculates a position of the second location within the first segment and calculates an estimated download time for a second segment using the position where the second segment being after the first segment. Then, the method determines whether to delay starting playback of the first segment at the second location when the first segment is downloaded into the buffer based on the estimated download time for the second segment.

In one embodiment, a non-transitory computer-readable storage medium contains instructions, that when executed, control a computer system to be configured for: receiving a seek command at a media player that is playing a media program at a first location, the seek command seeking to a second location in the media program; determining a first segment of the media program that is associated with the second location in the media program; downloading the first segment into a buffer; calculating a position of the second location within the first segment; calculating an estimated download time for a second segment using the position, the second segment being after the first segment; and determining whether to delay starting playback of the first segment at the second location when the first segment is downloaded into the buffer based on the estimated download time for the second segment.

In one embodiment, an apparatus includes: one or more computer processors; and a non-transitory computer-readable storage medium comprising instructions, that when executed, control the one or more computer processors to be configured for: receiving a seek command at a media player that is playing a media program at a first location, the seek command seeking to a second location in the media program; determining a first segment of the media program that is associated with the second location in the media program; downloading the first segment into a buffer; calculating a position of the second location within the first segment; calculating an estimated download time for a second segment using the position, the second segment being after the first segment; and determining whether to delay starting playback of the first segment at the second location when the first segment is downloaded into the buffer based on the estimated download time for the second segment.

The following detailed description and accompanying drawings provide a better understanding of the nature and advantages of particular embodiments.

DETAILED DESCRIPTION

Described herein are techniques for a dynamic seek processing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide dynamic seek processing that minimizes re-buffering after a seek request is received. Re-buffering is where media program playback is affected because the buffer does not have enough data (e.g., video) in it to play back the media program smoothly. In this case, the media program playback is interrupted while more data is downloaded into the buffer. When a seek occurs to a seeking position, a media player downloads a segment N of the media program that includes the seeking position. Sometimes the seeking position is close to the end of the segment N, such as the seeking position is 4.5 seconds inside the segment, and the segment N only contains 5 seconds of media program. In this case, if segment N starts playing once the downloading of segment N is finished, the next segment N+1 needs to be downloaded in 0.5 seconds to avoid re-buffering. In some cases, downloading the next segment N+1 of the media program may not be possible in 0.5 seconds and thus re-buffering will occur.

To address possible re-buffering, the media player employs a dynamic seeking process that may analyze playback factors to determine when to start playback after the segment N that contains the seeking position has been downloaded. Factors include the position within the segment N, the current bandwidth, the next segment's size, and the current bitrate being requested. Depending on these factors, the media player may decide to delay playback even though the segment N has already been downloaded. This allows the next segment N+1 more time to download and then playback can begin with less chance of re-buffering. Particular embodiments also provide a process to calculate the number of seconds to delay playback.

Figure 1:
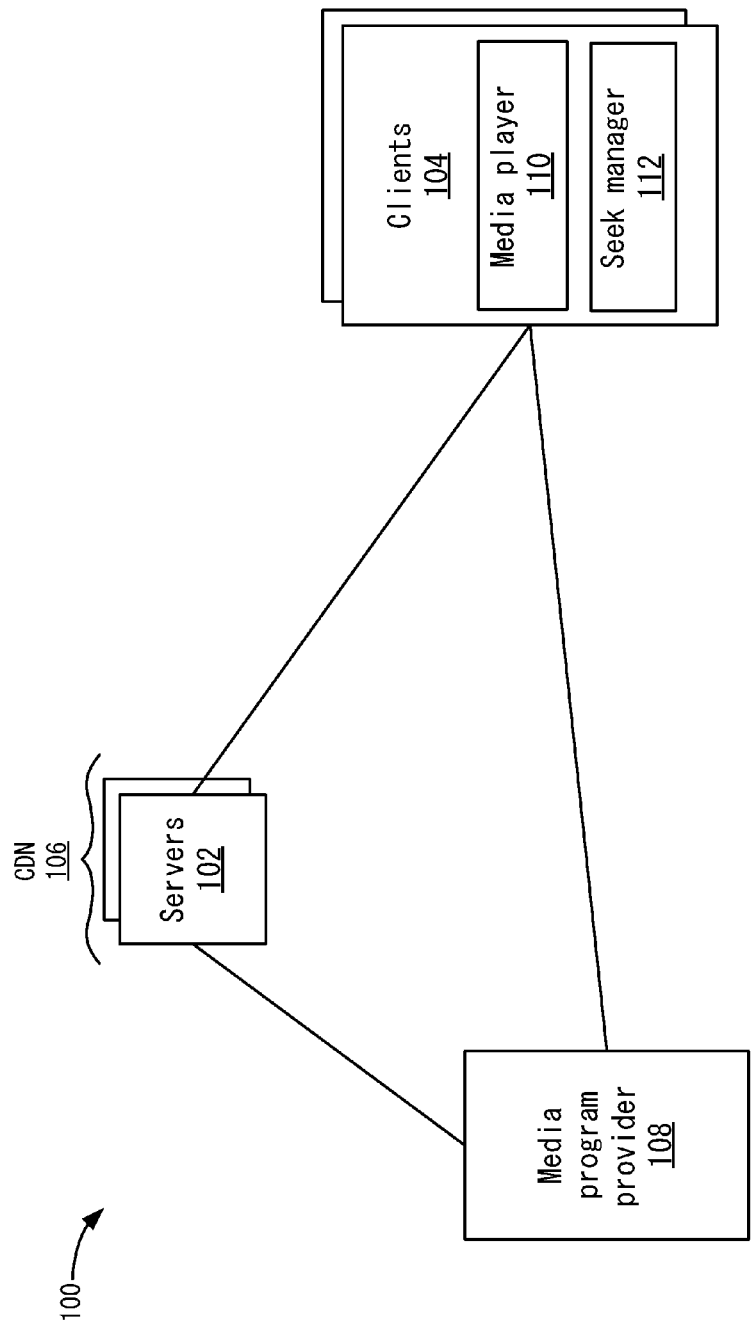
FIG. 1 depicts a system for processing a seek request to minimize re-buffering according to one embodiment.

FIG. 1 depicts a system 100 for processing a seek request to minimize re-buffering according to one embodiment. System 100 includes one or more servers 102 and one or more clients 104. Servers 102 may be part of a content delivery network (CDN) 106 that is used to deliver media programs to clients 104. Media programs may include video, audio, or a combination of audio and video. In one embodiment, a media program provider 108 provides a service that allows clients 104 to request media programs from media program provider 108 on demand once receiving the request, media program provider 108 uses CDN 106 to deliver the media programs to clients 104.

Client 104 may include various user devices, such as cellular phones, set top boxes, personal computers, tablet computers, etc. Client 104 may include a media player 110 that can play the media programs, such as videos or audio. In one embodiment, media player 110 is loaded and installed onto clients 104 by media program provider 108. In this case, media program provider 108 may provide the dynamic seek processing for seek requests using a seek manager 112 that may be installed in media player 110 and/or client 104. In other embodiments, media player 110 for media program provider 108 is pre-installed on clients 104.

In one example, server 102 stores various media programs, such as videos (e.g., a title, movie, or show) or audio, that have been (or will be) encoded in different versions at different bitrates. For example, a media program has been divided into segments that an encoder encodes at multiple bitrates, from high to low. A media program is stored as different versions (i.e., bitrates) as a first version of the media program (e.g., high bitrate), a second version of the media program (e.g., medium bitrate), . . . , and an N version of the media program (e.g., low bitrate). The different bitrates provide video content at different levels of quality. For example, a higher bitrate video will be of a higher quality (e.g., resolution) than the medium bitrate, and the medium bitrate of a higher quality than the lower bitrate. Although these encodings are described, various embodiments may include different encodings at any number of bitrates. The encoder segments the media program for the different bitrates into segments. The segments are the same size across different versions so media player 110 can switch to different bitrates during playback. However, the segments within the same version may be different sizes (or the same size).

Client 104 can request and receive media programs from server 102. For example, client 104 (e.g., media player 110) may request segments of the media program from server 102. While receiving the segments of media program, client 104 can use a multiple bitrate algorithm (MBR) to evaluate the available bandwidth experienced while receiving the media program. One evaluation client 104 may perform is measure the amount of video content received over a period of time to estimate the available bandwidth. Depending on the available bandwidth, client 104 may make decisions on which bitrate (or version) of the media program to request.

Media player 110 may use the MBR algorithm to determine when to switch to a different version of the media program. The MBR algorithm analyzes the available bandwidth and possibly other factors (e.g., computer processing unit load) to determine when to switch to a different version. For example, if the MBR algorithm determines that the available bitrate is 2 Mbps and client 104 is requesting the media program version at a bitrate of 1 Mbps, the MBR algorithm may determine that client 104 should request the media program version encoded at 2 Mbps.

During playback (after a play request is received), media player 110 may receive a seek request from a user. For example, the user may select a seeking position on a progress bar in media player 110. The seek request seeks to a different position than the current playback position of the media program. The user may seek forward or backward in time in the media program. For example, if the media program is currently playing at the 1-minute mark, then the user may seek forward to the 5-minute mark or backward to the 30-second mark.

A seek manager 112 may use a process that dynamically determines when to start playback when a seek request is received. This process calculates a different playback delay for each seek request that is received. For example, seek manager 112 may calculate that playback should start X number of units (e.g., seconds) after downloading the segment N that includes the seeking position. The playback is delayed even though the segment N has already been downloaded and can be played. The delaying of the playback of segment N may allow a next segment N+1 to start downloading and/or be downloaded before playback begins. Then, once playback starts, the probability that re-buffering occurs is reduced. That is, the chance that playback may be affected (e.g., interrupted or choppy) because not enough video is buffered is reduced when compared to if playback was not delayed.

Figure 2:
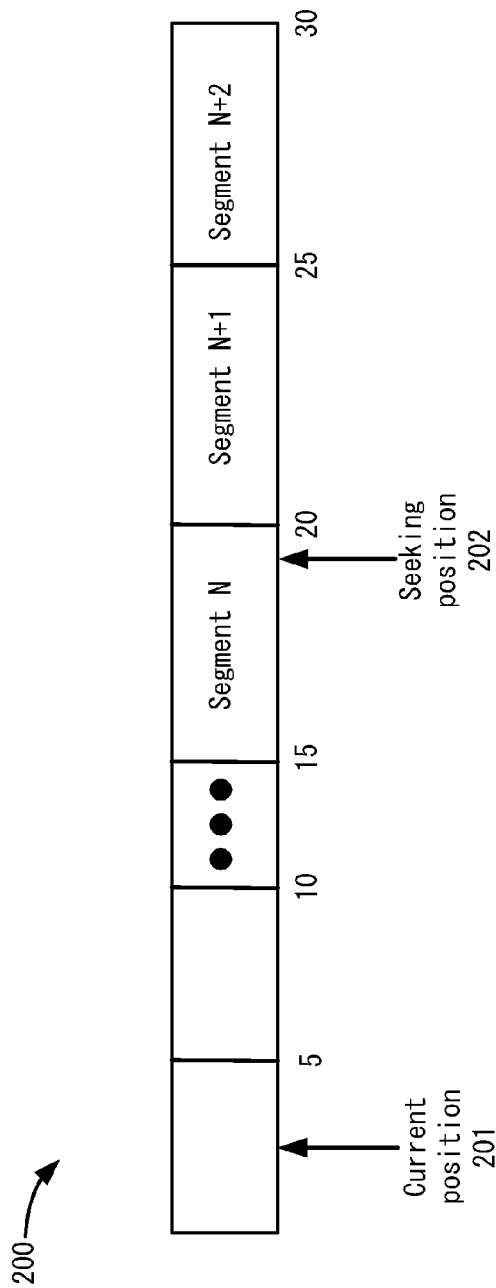
FIG. 2 depicts an example of the downloading of segments over time according to one embodiment.

FIG. 2 depicts an example of the downloading of segments 200 over time according to one embodiment. The media program has been segmented into segments 200 that may be 5 seconds long. However, the segments may be different lengths. Currently, the media program may have a current playback position at the 3 second mark of the media program, which is shown at 201. The user may then submit a seek request at a seeking position shown at 202. The seeking position may be at the 19.5 second mark of the media program (e.g., 19.5 seconds from the beginning of the media program). Also, segment N is the segment of the media program that includes the seeking position.

Once receiving the seek request, media player 110 then requests and downloads segment N because this segment includes the seeking position. When segment N is finished downloading, it has been stored in a buffer and media player 110 can play back segment N. Although downloading of segment N needs to be downloaded before playback, it is possible for playback to start before segment N has been downloaded. However, since the seeking position is 4.5 seconds inside of the segment (e.g., 4.5 seconds from the beginning of segment N), the media program will only play 0.5 seconds until the next segment needs to start playing. Thus, once playback begins, media player 110 needs to download segment N+1 in 0.5 seconds to avoid re-buffering. In some cases, 0.5 seconds may not be enough time to download segment N+1 before the playback of segment N finishes. This would cause re-buffering as discussed above.

Figure 3:
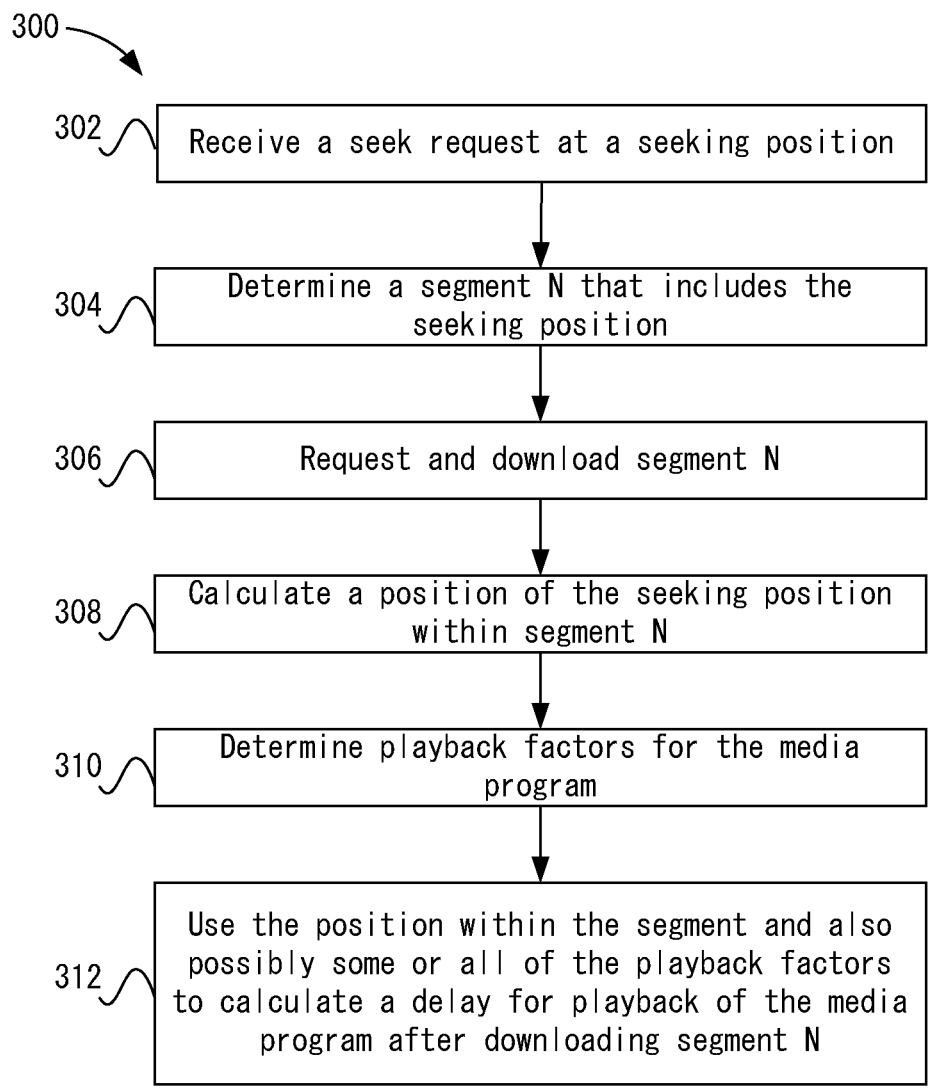
FIG. 3 depicts a simplified flowchart of a method for processing a seek request according to one embodiment.

Particular embodiments thus use the following process to avoid or minimize re-buffering. FIG. 3 depicts a simplified flowchart 300 of a method for processing a seek request according to one embodiment. At 302, media player 110 receives a seek request at a seeking position. As discussed above, the media player may be currently playing the media program at a current position that is different from the seeking position. In other embodiments, the media program may not have been started yet and the user wants to begin playback at the seeking position. Various methods of receiving the seek request may be appreciated, such as the user may select a position on a progress bar on media player 110. The user may also input a time via an entry box, use the fast forward or rewind commands, and other methods may be appreciated.

At 304, seek manager 112 determines a segment N that includes the seeking position. For example, if the seeking position is at 19.5 seconds within the media program, then a segment from 15 seconds to 20 seconds includes the seeking position. At 306, media player 110 requests segment N, and media player 110 downloads segment N.

At 308, seek manager 112 calculates a position of the seeking position within segment N. For example, if the segment is between 15 and 20 seconds and is 5 seconds long and the seeking position is at 19.5 seconds, then seek manager 112 determines that the seeking position is at 4.5 seconds from the beginning of segment N (or 0.5 seconds from the end of segment N). Other methods of quantifying the position within segment N may be appreciated, such as via percentages (e.g., the seeking position is at 95% of the segment N). It should be noted that the position within the segment N is used, which is different from the overall playback position of 19.5 seconds. The relationship of the seeking position within the segment N is needed to determine whether to delay playback.

At 310, seek manager 112 may determine playback factors for the media program. The playback factors may be real-time or non-real-time factors that are used to determine what affect current playback conditions may have on playback. Real-time factors are determined based on the present playback of the current media program. Non-real-time factors are based on historical data from playback of media programs other than the current media program. The playback factors may combine both real-time and non-real-time factors. The real time factors may include the current bandwidth being experienced by media player 110, the next segment's size, and the current streaming bitrate being requested. Other factors may also be appreciated, such as non-real-time factors of historical available bandwidth.

At 312, seek manager 112 uses the position within the segment and also possibly some or all of the playback factors to calculate a delay for playback of the media program after downloading segment N. Different methods may be used to calculate the delay. For example, if the seeking position is close to the end of the segment, it is more likely that seek manager 112 determines that the playback of the media program should be delayed. Also, if the bandwidth being experienced by media player 110 during downloading of the media program is low, then this makes it more likely seek manager 112 will delay playback of segment N. Further, if the next segment to be downloaded is large, seek manager 112 is more likely to wait to begin playback because the downloading of the next segment may take longer. Additionally, if the current bitrate being requested is higher, then this will cause the downloading of the next segment to take longer and increases the chance seek manager 112 will wait to start playback. The above factors may be used to calculate the delay of the playback.

Also, in addition to delaying playback, seek manager 112 may determine whether to switch to a lower bitrate (e.g., lower quality version of the media program) when requesting the current segment N and/or the next segment N+1. By requesting the lower bitrate version, the download time for the segment N+1 will be reduced and thus the waiting time for the user can be reduced. The same factors as above may be used to determine whether to switch to a lower bitrate. Also, thresholds may be used to determine whether to switch to a lower bitrate, such as if the delay in playback is greater than a threshold, such as 5 seconds, then seek manager 112 may determine that segment N+1 should be requested at a lower bitrate than the current bitrate being requested.

In one embodiment of the process used by media player 110, seek manager 112 first determines segment N, which contains the seeking position in the media program. If the seeking position is within a threshold, such as within the first half of segment N or a certain time from the beginning or end of the segment, then seek manager 112 requests segment N at the current bitrate or quality level Q. Otherwise, seek manager 112 may request a lower quality Q−1 or lower bitrate version of segment N, such as when the seeking position is in the second half of segment N. In other embodiments, this check may not be performed, and the same quality version of segment N currently being requested may be always requested regardless of the position of the seeking request or the lower quality version may always be requested. Other examples include:

1. Requesting a lower bitrate version of video segment N if the difference between seeking position and end of segment N is within a certain threshold.
2. Not changing a bitrate version of video segment N, but requesting a lower bitrate version of segment N+1 after calculating the playback delay and the playback delay is larger than a threshold.
3. Jointly use 1 and 2
4. When calculating playback delay, not relying on the downloading time of segment N. By doing this, the playback delay can be calculated before downloading segment N. A lower bitrate version of segment N can be requested if the calculated playback delay is larger than some threshold.
5. Jointly use 1 and 4.

Requesting a lower quality version may decrease the delay in playback that may occur when the seeking position is towards the end of the segment. Also, switching to the lower bitrate affects the following calculation of the downloading time for the next segment N+1 and this may decrease the delay will be discussed below.

When deciding to switch to a lower quality or bitrate for segment N and/or N+1, different rules may be used, such as the quality is switched down when the position within the segment is less than a threshold, such as M seconds. Also, the available bandwidth or segment size can also be taken into account when deciding when to switch to a lower bitrate. For example, seek manager 112 may switch to a lower bitrate if the size of segment N divided by available bandwidth (S(n)/bandwidth) is larger than a threshold W.

Seek manager 112 may also use the seeking position to determine whether to perform the calculation to delay playback. For example, if the seeking position is within the first portion (e.g., first half) of segment N, then the delay calculation may not be performed. This may be because it is assumed there is enough time to download the next segment.

However, different factors may also affect playback of segment N+1 and the delay calculation may always be performed. For example, available bandwidth and the size of segment N+1 may vary, and thus it is advisable to perform the delay calculation.

After finishing the downloading of segment N (or while media player 110 is downloading segment N), seek manager 112 estimates the download time for next segment N+1. The download time of next segment N+1 may be estimated using various factors, such as the size of the segment N+1, the estimated bandwidth, and the download time of segment N. In one embodiment, seek manager 112 uses the equation:

$$E = \frac{S(n+1)}{S(n)} * T(n) + C,$$

where E is the estimated download time of segment N+1, S(n+1) is the size of segment N+1, S(n) is the size of segment N, T(n) is a measured or estimated download time of segment N, and C is a constant empirical value. The estimated download time of segment N+1 may be the measured bandwidth that media player 110 has determined based on only based on the downloading of segment N. In other embodiments, the estimated bandwidth may be based on downloading of previous segments of the current media program in addition to or in lieu of segment N. In yet other embodiments, historical downloading of other segments from other media programs can be used to estimate the bandwidth. In cases where T(n) is the download time of only segment N, when media player 110 switches to a lower bitrate, the time T(n) will go down and will make the delay calculated smaller. When the bitrate or quality level is not lowered, then the download time increases when compared to downloading the lower quality version. Although the download time of segment N is described, the download time of other segments or an average of download time for multiple segments may be used. However, the bandwidth conditions may be changing all the time. Thus, using the downloading time of segment N could better represent the current bandwidth.

The sizes of segment N and segment N+1 may be determined in various ways. For example, media player 110 may receive a manifest when requesting the media program. The manifest may include the segment sizes that are included in the media program. Seek manager 112 can then use the manifest to determine the sizes of segment N and segment N+1.

The constant C may be omitted, but it is calculated such that re-buffering occurrences are reduced. The constant C may be used to adjust for the bandwidth estimation not being as accurate as needed. For example, it may be hard to estimate the bandwidth accurately based on just the downloading of segment N or other historical data. The constant may compensate for the bandwidth inaccuracies.

From the above equation, the estimated download time increases when the size of segment N+1 increases or is larger than the size of segment N. This is because the ratio of a size of segment N+1 and segment N is used. Also, when the download time of segment N increases, then the estimated download time of segment N+1 also increases.

Seek manager 112 then uses the estimated download time E of segment N+1 to calculate the delay in playback as X units (e.g., seconds or other granularities of time). In one embodiment, seek manager 112 uses the following equation:

$$X = MAX(0, E - (T_{end}(n) - T_{seek})),$$

where E is the estimated download time for segment N+1, $T_{end}(n)$ is the end of the end time in segment N, and $T_{seek}$ is the seeking time position. Although the value of "0" is used, other values may also be used. If X=0, then seek manager 112 starts playback immediately. If X is greater than 0, then media player 110 delays playback of the media program based on X, such as by X units (e.g., seconds).

In the above equation, the download time for segment N+1 is subtracted from the time of the end of segment N minus the seeking position. For example, if the time that segment N ends is at 20 seconds, and the seek time is 19.5 seconds, then the time within the segment N equals 0.5 seconds. This is the time of the seeking position from the end of the segment N. If the estimated download time is 2 seconds, then $E-(T_{end}(n)-T_{seek})$ may be calculated as 2−0.5=1.5 seconds. The maximum (MAX) of 0 and 1.5 seconds is 1.5 seconds. In this case, seek manager 112 may delay playback for 1.5 seconds. Other methods of calculating X may also be appreciated. For example, a factor can be multiplied to the value of E to make the delay in playback either more aggressive or less aggressive.

In another example, if the time that segment N ends is at 20 seconds, and the seek time is 15.5 seconds, then the time within segment N equals 4.5 seconds. This is the time of the seeking position from the end of the segment N. If the estimated download time is 2 seconds, then $E-(T_{end}(n)-T_{seek})$ may be calculated as 2−4.5=−2.5 seconds. In this case, the maximum of 0 seconds and −2.5 seconds is 0. Thus, seek manager 112 may not delay playback of segment N or N+1.

Figure 4:
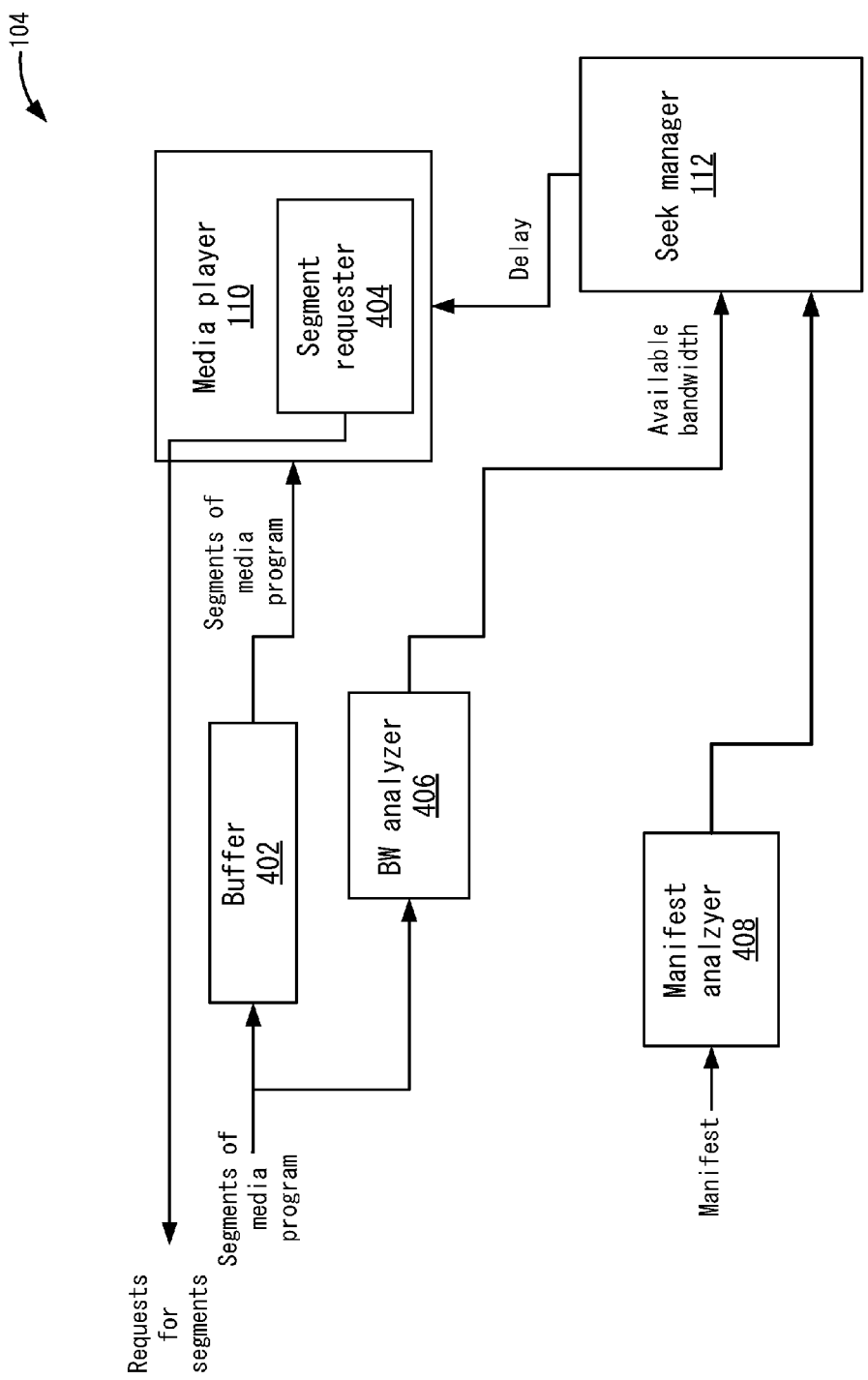
FIG. 4 depicts a more detailed example of a client according to one embodiment.

FIG. 4 depicts a more detailed example of client 104 according to one embodiment. Although components shown in client 104 are outside of media player 110, it is recognized that these components may be included in media player 110. For example, seek manager 112 may be logic included in media player 110.

A segment requester 404 is configured to request segments of the media program. For example, segment requester 404 may include a multiple bitrate algorithm that requests segments of the media program. As discussed above, the multiple bitrate algorithm may be used to determine which bitrate or version to request for segments of the media program. When segment requester 404 sends requests for the segments, segments of the media program are received at buffer 402. Buffer 402 receives the segments of the media program, buffers them, and then provides them to media player 110.

A bandwidth (BW) analyzer 406 can analyze the video received over time to determine the bandwidth. In one embodiment, bandwidth analyzer 406 may analyze how fast an amount of data is received in buffer 402 over a period of time. Bandwidth analyzer 406 uses this measurement to determine the current bandwidth being experienced for downloading the segments of media program. In one embodiment, bandwidth analyzer 406 analyzes how long it took to download segment N over a time period.

A manifest analyzer 408 receives the manifest for the media program and can analyze the manifest for seek manager 112. For example, manifest analyzer 408 may determine the length of the segments and also the start and stop times of the segments. For example, manifest analyzer 408 may determine that segment #1 is from 0 to 5 seconds, segment #2 from 5 to 8 seconds, segment #3 from 8 to 12 seconds, etc. Manifest analyzer 408 provides this information to seek manager 112 so that seek manager can determine the size of the segments and also calculate the seeking position's relation to the end time of the segment.

When seek manager 112 receives a seek request, seek manager 112 may use the information received from manifest analyzer 408 and the available bandwidth from bandwidth analyzer 406 to determine if playback should be delayed and/or if the bitrate being requested should be reduced. For example, seek manager 112 may perform the calculations as described above. If the quality of the segment N should be reduced, seek manager 112 communicates with segment requester 404 to have it request segment N at a lower quality or bitrate. This may override the MBR algorithm used by segment requester 404. Further, if seek manager 112 determines that next segment N+1 should be requested with a lower quality, seek manager 112 similarly communicates with segment requester 404 to request a lower quality segment N+1.

Also, seek manager 112 may use information from bandwidth analyzer 406 and manifest analyzer 408 to determine a playback delay, if any. If a playback delay is determined, then seek manager 112 communicates the delay to media player 110. Media player 110 can then delay playback of segment N of the media program for X seconds. In this case, segment N remains in buffer 402 for the X seconds. While this occurs, the next segment N+1 is downloaded into buffer 402.

Accordingly, particular embodiments can minimize the re-buffer occurrences after seeking and also control the waiting time when seeking. After the playback is delayed, users experience smooth streaming of the media program with minimal re-buffering, which can improve the quality of the experience while adding just a short wait.

System Overview

Figure 5:
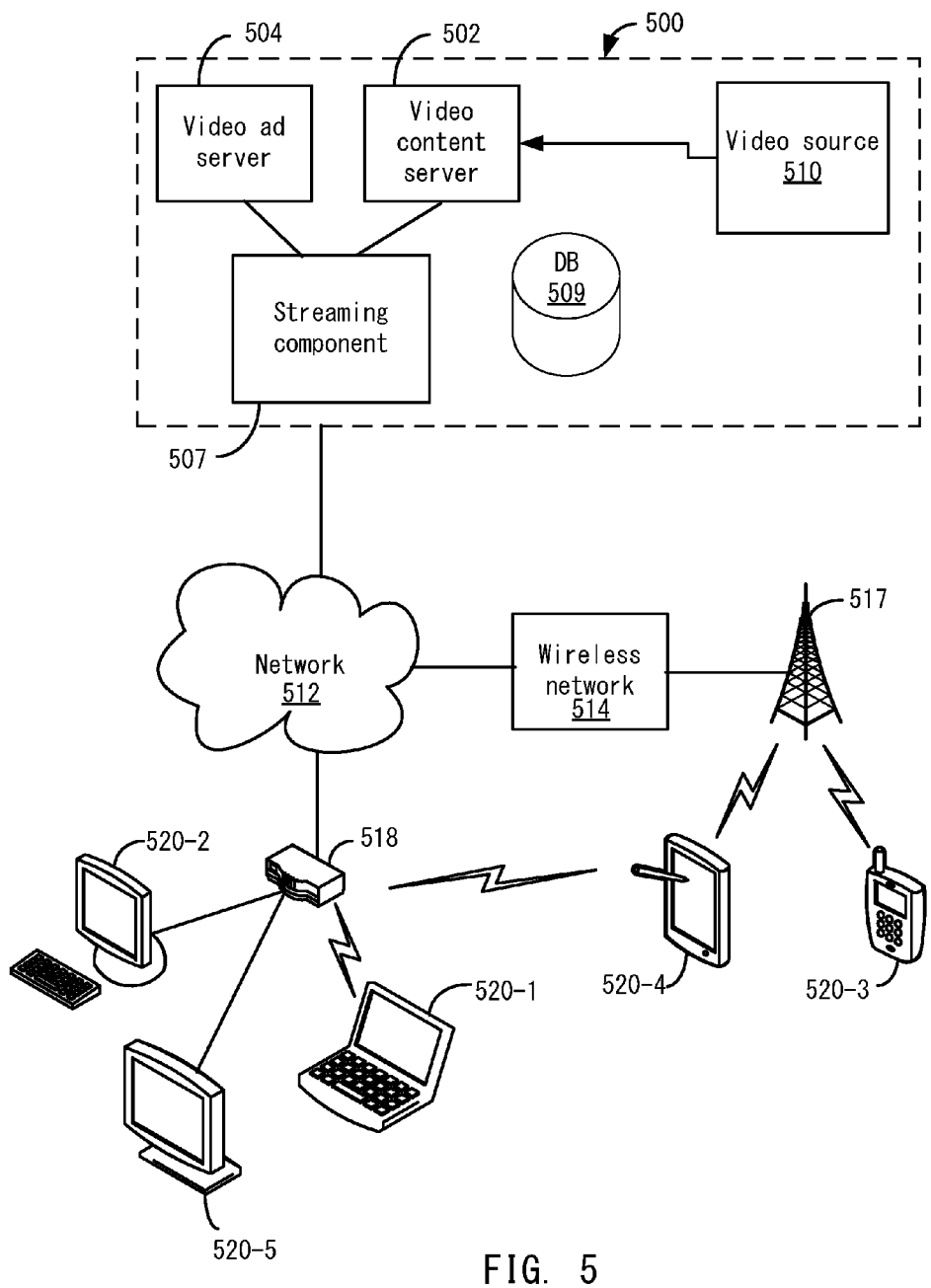
FIG. 5 depicts a media program streaming system in communication with multiple client devices via one or more communication networks according to one embodiment.

Features and aspects as disclosed herein may be implemented in conjunction with a media program streaming system 500 in communication with multiple client devices via one or more communication networks as shown in FIG. 5. Aspects of the media program streaming system 500 are described merely to provide an example of an application for enabling distribution and delivery of content prepared according to the present disclosure. It should be appreciated that the present technology is not limited to streaming media program applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 500, media program data may be obtained from one or more sources for example, from a media program source 510, for use as input to a media program content server 502. The input media program data may comprise raw or edited frame-based media program data in any suitable digital format, for example, Moving Pictures Experts Group (MPEG)-1, MPEG-2, MPEG-4, VC-1, H.264/Advanced Media program Coding (AVC), High Efficiency Media program Coding (HEVC), or other format. In an alternative, a media program may be provided in a non-digital format and converted to digital format using a scanner and/or transcoder. The input media program data may comprise media program clips or programs of various types, for example, television episodes, motion pictures, and other content produced as primary content of interest to consumers. The media program data may also include audio or only audio may be used.

The media program streaming system 500 may include one or more computer servers or modules 502, 504, and/or 507 distributed over one or more computers. Each server 502, 504, 507 may include, or may be operatively coupled to, one or more data stores 509, for example databases, indexes, files, or other data structures. A media program content server 502 may access a data store (not shown) of various media program segments. The media program content server 502 may serve the media program segments as directed by a user interface controller communicating with a client device. As used herein, a media program segment refers to a definite portion of frame-based media program data, such as may be used in a streaming media program session to view a television episode, motion picture, recorded live performance, or other media program content.

In some embodiments, a media program advertising server 504 may access a data store of relatively short media programs (e.g., 10 second, 30 second, or 60 second media program advertisements) configured as advertising for a particular advertiser or message. The advertising may be provided for an advertiser in exchange for payment of some kind, or may comprise a promotional message for the system 500, a public service message, or some other information. The media program advertising server 504 may serve the media program advertising segments as directed by a user interface controller (not shown).

The media program streaming system 500 may further include an integration and streaming component 507 that integrates media program content and media program advertising into a streaming media program segment. For example, streaming component 507 may be a content server or streaming media server. A controller (not shown) may determine the selection or configuration of advertising in the streaming media program based on any suitable algorithm or process. The media program streaming system 500 may include other modules or units not depicted in FIG. 5, for example administrative servers, commerce servers, network infrastructure, advertising selection engines, and so forth.

The media program streaming system 500 may connect to a data communication network 512. A data communication network 512 may comprise a local area network (LAN), a wide area network (WAN), for example, the Internet, a telephone network, a wireless cellular telecommunications network (WCS) 514, or some combination of these or similar networks.

One or more client devices 520 may be in communication with the media program streaming system 500, via the data communication network 512 and/or other network 514. Such client devices may include, for example, one or more laptop computers 520-1, desktop computers 520-2, "smart" mobile phones 520-3, tablet devices 520-4, network-enabled televisions 520-5, or combinations thereof, via a router 518 for a LAN, via a base station 517 for a wireless telephony network 514, or via some other connection. In operation, such client devices 520 may send and receive data or instructions to the system 500, in response to user input received from user input devices or other input. In response, the system 500 may serve media program segments and metadata from the data store 509 responsive to selection of media programs to the client devices 520. Client devices 520 may output the media program content from the streaming media program segment in a media player using a display screen, projector, or other media program output device, and receive user input for interacting with the media program content.

Distribution of audio-media program data may be implemented from streaming component 507 to remote client devices over computer networks, telecommunications networks, and combinations of such networks, using various methods, for example streaming. In streaming, a content server streams audio-media program data continuously to a media player component operating at least partly on the client device, which may play the audio-media program data concurrently with receiving the streaming data from the server. Although streaming is discussed, other methods of delivery may be used. The media player component may initiate play of the media program data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for media program files, and with information about the format, bandwidth and structure of those files, delivers just the amount of data necessary to play the media program, at the rate needed to play it. Streaming media servers may also account for the transmission bandwidth and capabilities of the media player on the destination client. Streaming component 507 may communicate with client device 520 using control messages and data messages to adjust to changing network conditions as the media program is played. These control messages can include commands for enabling control functions such as fast forward, fast reverse, pausing, or seeking to a particular part of the file at the client.

Since streaming component 507 transmits media program data only as needed and at the rate that is needed, precise control over the number of streams served can be maintained. The viewer will not be able to view high data rate media programs over a lower data rate transmission medium. However, streaming media servers (1) provide users random access to the media program file, (2) allow monitoring of who is viewing what media program programs and how long they are watched (3) use transmission bandwidth more efficiently, since only the amount of data required to support the viewing experience is transmitted, and (4) the media program file is not stored in the viewer's computer, but discarded by the media player, thus allowing more control over the content.

Streaming component 507 may use TCP-based protocols, such as HTTP and Real Time Messaging Protocol (RTMP). Streaming component 507 can also deliver live webcasts and can multicast, which allows more than one client to tune into a single stream, thus saving bandwidth. Streaming media players may not rely on buffering the whole media program to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers media program over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the media program.

The delivery of media program content by streaming may be accomplished under a variety of models. In one model, the user pays for the viewing of media program programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a media program, which times may be referred to as "ad slots" or "ad breaks." With streaming media program, the media player may be configured so that the client device cannot play the media program without also playing predetermined advertisements during the designated ad slots.

Figure 6:
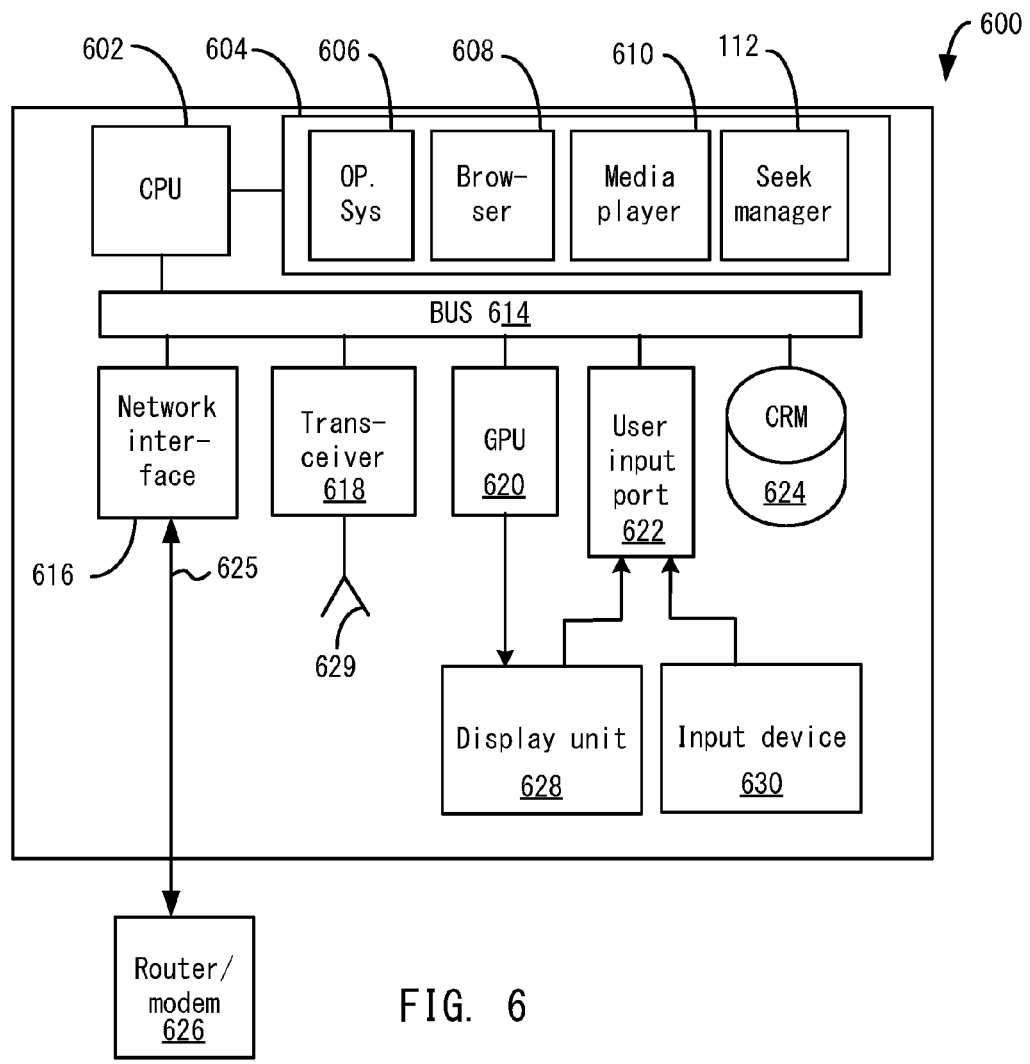
FIG. 6 depicts a diagrammatic view of an apparatus for viewing media program content and advertisements.

Referring to FIG. 6, a diagrammatic view of an apparatus 600, such as client 104, for viewing media program content and advertisements is illustrated. In selected embodiments, the apparatus 600 may include a processor (CPU) 602 operatively coupled to a processor memory 604, which holds binary-coded functional modules for execution by the processor 602. Such functional modules may include an operating system 606 for handling system functions such as input/output and memory access, a browser 608 to display web pages, and media player 610 for playing media program. The modules may further include seek manager 112. The memory 604 may hold additional modules not shown in FIG. 6, for example modules for performing other operations described elsewhere herein.

A bus 614 or other communication component may support communication of information within the apparatus 600. The processor 602 may be a specialized or dedicated microprocessor configured to perform particular tasks in accordance with the features and aspects disclosed herein by executing machine-readable software code defining the particular tasks. Processor memory 604 (e.g., random access memory (RAM) or other dynamic storage device) may be connected to the bus 614 or directly to the processor 602, and store information and instructions to be executed by a processor 602. The memory 604 may also store temporary variables or other intermediate information during execution of such instructions.

A computer-readable medium in a storage device 624 may be connected to the bus 614 and store static information and instructions for the processor 602; for example, the storage device (CRM) 624 may store the modules 606, 608, and 610 when the apparatus 600 is powered off, from which the modules may be loaded into the processor memory 604 when the apparatus 600 is powered up. The storage device 624 may include a non-transitory computer-readable storage medium holding information, instructions, or some combination thereof, for example instructions that when executed by the processor 602, cause the apparatus 600 to be configured to perform one or more operations of a method as described herein.

A communication interface 616 may also be connected to the bus 614. The communication interface 616 may provide or support two-way data communication between the apparatus 600 and one or more external devices, e.g., the streaming system 500, optionally via a router/modem 626 and a wired or wireless connection. In the alternative, or in addition, the apparatus 600 may include a transceiver 618 connected to an antenna 629, through which the apparatus 600 may communicate wirelessly with a base station for a wireless communication system or with the router/modem 626. In the alternative, the apparatus 600 may communicate with a media program streaming system 500 via a local area network, virtual private network, or other network. In another alternative, the apparatus 600 may be incorporated as a module or component of the system 500 and communicate with other components via the bus 614 or by some other modality.

The apparatus 600 may be connected (e.g., via the bus 614 and graphics processing unit 620) to a display unit 628. A display 628 may include any suitable configuration for displaying information to an operator of the apparatus 600. For example, a display 628 may include or utilize a liquid crystal display (LCD), touchscreen LCD (e.g., capacitive display), light emitting diode (LED) display, projector, or other display device to present information to a user of the apparatus 600 in a visual display.

One or more input devices 630 (e.g., an alphanumeric keyboard, microphone, keypad, remote controller, game controller, camera or camera array) may be connected to the bus 614 via a user input port 622 to communicate information and commands to the apparatus 600. In selected embodiments, an input device 630 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 628, for example using a touch sensitive screen. A cursor control device may communicate direction information and command selections to the processor 602 and control cursor movement on the display 628. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
  receiving, by a computing device, a seek command at a media player that is playing a media program at a first location, the seek command seeking to a second location in the media program;
  determining, by the computing device, a first segment of the media program that is associated with the second location in the media program;
  downloading, by the computing device, the first segment into a buffer;
  calculating, by the computing device, a position of the second location within the first segment;
  calculating, by the computing device, an estimated download time for a second segment using the position, the second segment being after the first segment; and
  determining, by the computing device, whether to delay starting playback of the first segment at the second location when the first segment is downloaded into the buffer based on the estimated download time for the second segment.

2. The method of claim 1, wherein the position is based on a start position of the first segment or an end position of the first segment.

3. The method of claim 2, wherein the position is calculated based on how close the second location is to the end position of the segment compared to the start position.

4. The method of claim 1, wherein calculating the estimated download time of the second segment comprises:
  determining a first size of the first segment;
  determining a second size of the second segment;
  determining a measured download time; and
  using the first size, the second size, and the measured download time to calculate the estimated download time of the second segment.

5. The method of claim 4, wherein the measured download time is based on a measured download time of the first segment.

6. The method of claim 5, wherein the measured download time is based on a measured download time of another segment other than the first segment.

7. The method of claim 4, wherein determining the first size and the second size comprises:
  reviewing a manifest for the media program, the manifest including information for segments in the media program; and
  calculating the first size and the second size from the information.

8. The method of claim 4, wherein calculating the estimated download time comprises:
  using a constant with the first size, the second size, and the measured download time to calculate the estimated download time.

9. The method of claim 4, wherein calculating the estimated download time comprises performing:

$$E = \frac{S(n+1)}{S(n)} * T(n),$$

where E is the estimated download time, S(n+1) is the first size, S(n) is the second size, and T(n) is the measured download time.

10. The method of claim 1, wherein determining whether to delay playback comprises:
calculating X units for the playback based on the estimated download time and the position.

11. The method of claim 10, wherein calculating X units comprises taking a maximum of a first value of M units and a second value based on the estimated download time and the position.

12. The method of claim 11, wherein calculating comprises using an equation of:

$$X = MAX(M, E-(T_{end}(n)-T_{seek})),$$

where X is the X units, MAX is a maximum, E is the estimated download time, $T_{end}(n)$ is an end time of the first segment, M is the M units, and $T_{seek}$ is a time of the second location.

13. The method of claim 1, further comprising:
downloading the second segment into the buffer while the playback of the first segment is delayed.

14. The method of claim 1, further comprising:
before downloading the first segment, determining whether to switch to a lower quality version for the first segment than a current quality version being requested for the media program.

15. The method of claim 1, further comprising:
before downloading the second segment, determining whether to switch to a lower quality version for the second segment than a current quality version being requested for the media program, wherein the determining whether to switch is based on the delay.

16. A non-transitory computer-readable storage medium containing instructions, that when executed, control a computer system to be configured for:
receiving a seek command at a media player that is playing a media program at a first location, the seek command seeking to a second location in the media program;
determining a first segment of the media program that is associated with the second location in the media program;
downloading the first segment into a buffer;
calculating a position of the second location within the first segment;
calculating an estimated download time for a second segment using the position, the second segment being after the first segment; and
determining whether to delay starting playback of the first segment at the second location when the first segment is downloaded into the buffer based on the estimated download time for the second segment.

17. The non-transitory computer-readable storage medium of claim 16, wherein calculating the estimated download time of the second segment comprises:
determining a first size of the first segment;
determining a second size of the second segment;
determining a measured download time; and
using the first size, the second size, and the measured download time to calculate the estimated download time of the second segment.

18. The non-transitory computer-readable storage medium of claim 17, wherein calculating the estimated download time comprises performing:

$$E = \frac{S(n+1)}{S(n)} * T(n),$$

where E is the estimated download time, S(n+1) is the first size, S(n) is the second size, and T(n) is the measured download time.

19. The non-transitory computer-readable storage medium of claim 16, wherein determining whether to delay playback comprises:
calculating X units for the playback based on the estimated download time and the position.

20. An apparatus comprising:
one or more computer processors; and
a non-transitory computer-readable storage medium comprising instructions, that when executed, control the one or more computer processors to be configured for:
receiving a seek command at a media player that is playing a media program at a first location, the seek command seeking to a second location in the media program;
determining a first segment of the media program that is associated with the second location in the media program;
downloading the first segment into a buffer;
calculating a position of the second location within the first segment;
calculating an estimated download time for a second segment using the position, the second segment being after the first segment; and
determining whether to delay starting playback of the first segment at the second location when the first segment is downloaded into the buffer based on the estimated download time for the second segment.

* * * * *